_

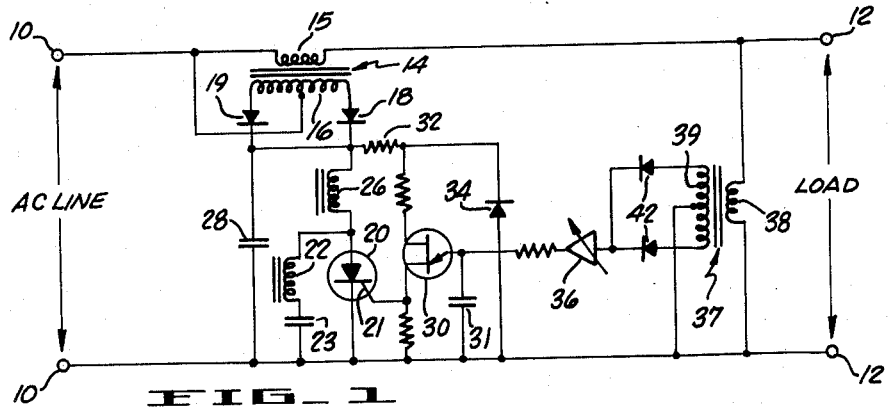
FIG_1
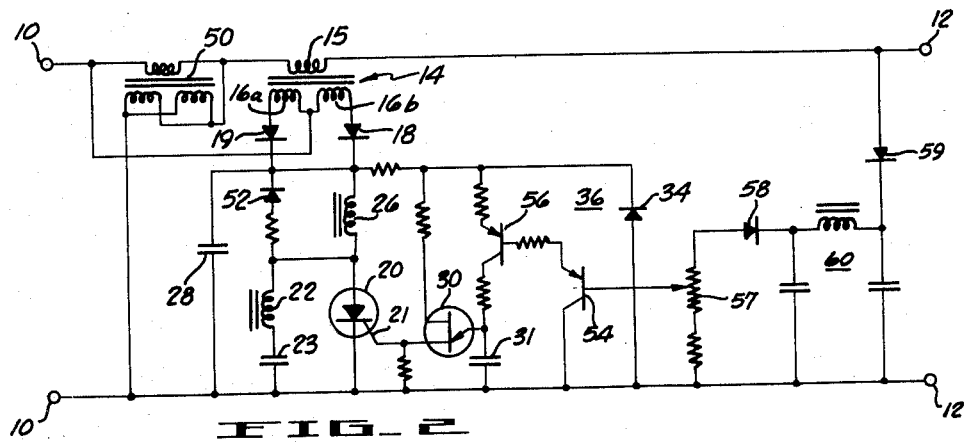
FIG_2
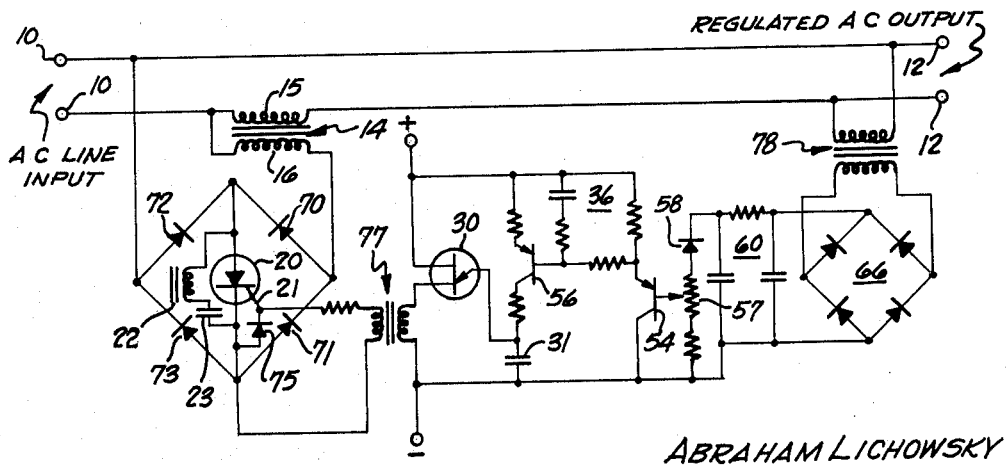
FIG_3
ABRAHAM LICHOWSKY
INVENTOR.
BY Robert G. Clay
ATTORNEY

United States Patent Office 3,129,380
Patented Apr. 14, 1964

3,129,380
BUCK BOOST TRANSFORMER CONTROLLED BY SILICON CONTROLLED RECTIFIER
Abraham Lichowsky, San Carlos, Calif., assignor to Ampex Corporation, Redwood City, Calif., a corporation of California
Filed June 23, 1961, Ser. No. 119,190
14 Claims. (Cl. 323—45)

This invention relates to voltage regulating circuits and more particularly to such circuits employing solid state devices as control elements.

Because of the common need to provide a stabilized output voltage which is derivable from a line voltage that may occasionally fluctuate rather widely, voltage regulating circuits are well known in the art. The most common of these employ a vacuum tube or a transistor as a series regulating element, the conductance of which may be controlled in accordance with the output or load voltage. However, regulating circuits of this type are necessarily subject to a voltage drop and a power loss within the regulating element. As a result the power which may be transmitted to the load through a regulating circuit of this type is necessarily rather limited, and furthermore the maximum available output voltage is diminished from the input or line voltage by the amount of the voltage drop across the regulating element.

Because of the advantages such as smaller size, increased reliability and simplified associated circuitry inherent in solid state devices as compared with vacuum tubes, voltage regulating circuits employing semiconductors have substantially replaced those utilizing vacuum tubes. Transistors, however, have not proved to be completely satisfactory for such applications in view of their limited voltage and current ratings. Thus the control of large currents at substantially high voltage is practically impossible with transistors. A device which has been more recently developed in order to overcome the inherent deficiencies in transistors and similar semiconductor devices when employed as voltage regulators is the silicon controlled rectifier. This device is designed to be used as a high current, high voltage, high efficiency switch and its ability to serve as such makes it a desirable solid state device for voltage regulation. The silicon controlled rectifier is a device of small size and is capable of operation at relatively high currents with low forward voltage drop. The triggering time of the silicon controlled rectifier is on the order of a few microseconds and the device may be cycled at a pulse repetition rate of several kilocycles per second. In addition the ratio of maximum conduction current to control current required for triggering is extremely high. It can be understood therefore that these advantages among others qualify the silicon controlled rectifier as a superior device for use in voltage regulating circuits.

Previously known circuits which have provided for the regulaton of an alternating current (A.C.) signal by means of circuitry including silicon controlled rectifiers have generally depended upon connecting the silicon controlled rectifier in series with the load in order to control the current thereto. While the silicon controlled rectifier is a high current device when compared with most transistors, its current rating is not unlimited and thus such arrangements not only limit the available load current at the maximum current rating of the silicon controlled rectifier but furthermore must provide some sort of overload protection for the silicon controlled rectifier so that the occurrence of a short circuit in the load does not burn out the rectifier. The requirement for such protective circuits necessarily complicates the arrangement of a regulating circuit, rendering it more complex and expensive to produce and maintain.

It is therefore a general object of the invention to provide an improved voltage regulating arrangement including a silicon controlled rectifier.

It is an object of the invention to provide a voltage regulating arrangement employing a silicon controlled rectifier in which the maximum current to the load is not limited by the current rating of the silicon controlled rectifier.

It is an object of the invention to provide a regulating circuit for an alternating current signal source which is capable of providing regulation at increased levels of load current.

More specifically, it is an object of this invention to provide a line voltage regulating circuit including a silicon controlled rectifier whereby the line voltage may be increased or decreased as required in order to provide a particular value of output voltage.

Briefly, the invention encompasses a circuit for A.C. line voltage regulation in which a transformer known as a "boost buck" transformer is interposed in series between the A.C. line and the load requiring a regulated voltage. The boost buck transformer is controlled by a silicon controlled rectifier which in turn is responsive to an oscillator comprising a unijunction transistor. A feedback loop from the load side of the regulating circuit is provided to develop a voltage in accordance with the output voltage which is applied to control the frequency of oscillation of the unijunction transistor circuit. In accordance with the invention, therefore, as the output voltage varies from the preselected value, a feedback voltage is developed which increases or decreases the frequency of the unijunction transistor oscillator accordingly so as to trigger the silicon controlled rectifier at a corresponding pulse rate, thus developing the requisite compensation by means of the boost buck transformer.

In one arrangement of the invention, the feedback voltage is derived by means of a transformer connected across the output terminals. A pair of rectifiers connected to the transformer provides the desired unidirectional feedback voltage.

In other specific arrangements of the invention, the feedback voltage is developed by means of a rectifier and low-pass filter connected across the output line in order to provide improved regulation. A second arrangement of the invention also includes an additional transformer connected in series with the line in order that regulation may be provided over a wider range of line voltages.

A better understanding of the invention may be obtained from a reading of the following detailed description taken in conjunction with the drawings wherein like reference numerals are used to refer to like elements and in which:

FIGURE 1 is a schematic representation of one particular arrangement of the invention;

FIGURE 2 is a schematic representation of another particular arrangement of the invention; and FIGURE 3 is a schematic representation of yet another particular arrangement of the invention.

Turning now to FIGURE 1 there is shown therein a circuit of one particular arrangement of the invention having a pair of input terminals 10 for connection to an A.C. source, such as an A.C. line, and a pair of output terminals 12 for connection to a load. A boost buck transformer 14 is shown having a first winding 15 connected in series with one side of the line between associated terminals 10 and 12. A second winding 16 of the transformer 14 is connected at its center tap to the adjacent input terminal 10. A pair of diodes 18 and 19 provide connection to the opposite ends of the winding 16 in a conventional full wave rectifier arrangement. The polarity of the voltage across the winding 15 with respect to the voltage at the winding 16 determines whether the input voltage at the terminals 10 is increased or decreased by the regulator circuit. Thus the boost buck transformer 14 may be connected either to increase the line voltage where it is below some desired value or to decrease the line voltage where it is undesirably high. The amount by which the input A.C. voltage is increased or decreased across the winding 15 is determined in accordance with the invention by controlling the current drawn from the winding 16 as a function of the output voltage developed across the terminals 12.

To control the current in the winding 16, a silicon controlled rectifier 20 is connected to the output terminals of the diodes 18 and 19 of the full wave rectifier circuit via an inductance coil 26. The silicon controlled rectifier 20 has its gating, or triggering, electrode 21 connected to an oscillator circuit comprising a unijunction transistor 30. A filter capacitor 28 is connected across the output of the full wave rectifier including the winding 16 and the voltage across the unijunction transistor 30 is stabilized by virtue of the voltage dropping network comprising the resistor 32 and the zener diode 34. The input, or control, electrode of the unijunction transistor 30 is connected to a capacitor 31 which stores current from a variable gain servo amplifier and compensation circuit 36 which is driven by a transformer 37, the primary winding 38 of which is connected across the output terminals 12. Diodes 42 connected to the secondary winding 39 provide a direct current (D.C.) signal at the input of the amplifier 36. In accordance with one aspect of the invention a self-quenching circuit comprising an inductance 22 and a capacitor 23 are connected across the silicon controlled rectifier 20 in order to extinguish the rectifier 20 whenever it is triggered into conduction.

In the operation of the arrangement of FIGURE 1, the transformer 14 provides a change of voltage between the terminals 10 and the terminals 12 in accordance with the current which is drawn through the winding 16. Thus the transformer 14 functions as an autotransformer through which current is drawn intermittently by the silicon controlled rectifier 20. Whenever the rectifier 20 is triggered by a signal applied to its gating electrode 21 from the unijunction transistor 30, the rectifier 20 remains conducting for a fixed interval of time. This period of conduction for the silicon controlled rectifier 20 is determined by the time constant of the self-quenching circuit comprising the inductance 22 and capacitor 23. In accordance with the invention the repetition rate of the triggering pulses applied to the gating electrode 21 from the free-running, frequency controlled oscillator comprising the unijunction transistor 30 is determined by the signal voltage fed to the capacitor 31 from the load terminals 12 via the circuit including the servo amplifier 36 and the transformer 37. In this manner the voltage at the terminals 12 is maintained at a preselected value despite the fact that the A.C. input voltage applied to the terminals 10 may fluctuate rather widely.

As an example, assume that the A.C. line voltage is below the value of 117 volts which is desired to be maintained across the output terminals 12, and may fluctuate between 100 and 115 volts A.C. The boost buck transformer 14 is then connected with a polarity of the winding 15 such as to increase the voltage applied to the terminals 10 in accordance with the current drawn through the winding 16. As the voltage across the output terminals 12 tends to decrease in value, as may occur for a change of load requiring more current or a decrease in the A.C. line voltage at the input terminals 10, the D.C. signal applied at the input of the servo amplifier 36 from the transformer 37 via the diodes 42 also diminishes in value. In this case the phase of the voltage presented at the output of the servo amplifier 36 is arranged to be such that the voltage across the capacitor 31 increases when the voltage at the input of the amplifier 36 decreases. As a result the repetition rate of the free-running oscillator including the unijunction transistor 30 is caused to increase, thus triggering the silicon controlled rectifier 20 more frequently and causing an increase in the current drawn from the winding 16 of the transformer 14 which is now operating as a boost transformer. Consequently an increased voltage is developed across the winding 15 which adds to the A.C. line voltage at the terminals 10 to compensate for the assumed fluctuation at the output terminals 12. If, on the other hand, the output voltage at the terminals 12 tends to increase, the feedback signal from the transformer 37 is presented by the phase change in the servo amplifier 36 as a decrease in voltage across the capacitor 31. As a result the repetition rate of the free-running oscillator including the unijunction transistor 30 is decreased, thus causing less current to be drawn from the winding 16 through the silicon controlled rectifier 20. Consequently, the boost voltage developed across the winding 15 is decreased to compensate for the increase in the output voltage across the terminals 12. In accordance with the invention, the silicon controlled rectifier 20 is used as a high frequency switch alternately connecting and disconnecting the winding 16 of the transformer 14 from the line. By virtue of this arrangement, an improved regulation of the output voltage is afforded with an increased speed of response to rapid or transient fluctuations thereof.

The operation of the circuit of FIGURE 1 in order to provide a reduction of the A.C. line voltage to a regulated preselected value at the output terminals 12 is effected in much the same fashion as that already described. For this purpose, the winding 15 of the transformer 14 is connected to buck, or oppose, the voltage present at the terminals 10. Also the servo amplifier 36 is arranged to provide no phase change for the feedback signals amplified therethrough. Such a connection may be employed where the input voltage fluctuates between 120 and 130 volts A.C. and a regulated output of 117 volts is desired, for example. Under these conditions an increase in the output voltage across the terminals 12 results in an increase in the voltage developed across the capacitor 31 at the input of the transistor 30. As a result the repetition rate of the oscillator including the unijunction transistor 30 is increased, thereby triggering the silicon controlled rectifier 20 more frequently so that the relative On time of the rectifier 20 is increased. This draws more current from the winding 16 of what is now the buck transformer 14 so that the magnitude of the bucking voltage across the winding 15 is increased, thus compensating for the increase in voltage across the terminals 12. If, on the other hand, the output voltage at the terminals 12 tends to decrease, the voltage across the capacitor 31 also decreases, the repetition rate of the oscillator including the transistor 30 decreases, and the magnitude of the bucking voltage at the winding 15 diminishes to compensate for the decrease of voltage at the terminals 12. In this manner in accordance with the invention, the output voltage at the terminals 12 is maintained at a substantially constant value, even though the voltage of the A.C. line applied to the terminals 12 may fluctuate widely.

In FIGURE 2 a particular arrangement of the invention is shown in which a step-down transformer 50 is shown connected adjacent the input terminals 10 and ahead of the boost transformer 14. By stepping down the A.C. line voltage before it is applied to the regulating circuit of the invention, the transformer 50 insures that the transformer 14 may be utilized as a boost transformer without regard to a consideration of its use as a bucking transformer in the event that the input voltage is too high. Also in FIGURE 2 a somewhat different arrangement is employed for deriving the D.C. feedback signal from the output terminals 12. This arrangement utilizes a rectifier 59 and a conventional filter 60 to provide a positive D.C. signal for application across the potentiometer 57 in accordance to the fluctuations of the A.C. signal present at the output terminals 12. The servo amplifier 36 of FIGURE 1 is shown comprising the adjustable gain control potentiometer 57 and the transistors 54, 56 which are arranged to provide a phase reversal for signals applied across the potentiometer 57. The potentiometer 57 advantageously provides a range of adjustment within which the desired magnitude of the regulated output voltage at the terminals 12 may be selected. In operation, if the voltage across the output terminals 12 tends to increase for any given gain setting of the potentiometer 57, the signal applied to the input electrode of the transistor 54 becomes more positive. This is applied to the transistor 56 as a positive signal, thus tending to decrease conduction therein and reducing the voltage across the capacitor 31. As a result the repetition rate of the oscillator comprising the unijuntcion transistor 30 decreases reducing the effective On time of the silicon controlled rectifier 20 and diminishing the voltage developed across the winding 15 which is employed in this arrangement to boost the voltage developed from the terminals 10 at the output of the transformer 50. Accordingly an increase in the voltage at the terminals 12 results in a decrease of the boost voltage developed by the winding 15, thus compensating for the voltage change and maintaining the output voltage substantially constant. In a similar fashion a decrease in the output voltage results in an increase of the boost voltage from the winding 15 to provide the requisite compensation. In the arrangement of FIGURE 2, a diode 52 is shown connected across the inductance 26 to absorb the inverse voltage peaks generated by the inductance 26 when the silicon controlled rectifier 20 is extinguished. It will be obvious that the transformer 50 may be connected to step up the input voltage, in which case the transformer 14 is connected as a bucking transformer and the feedback signal is fed directly to the capacitor 31 without any phase reversal.

The arrangement of the invention shown in FIGURE 3 is similar to the arrangement of FIGURE 2 without the transformer 50. In addition bridge rectifiers are employed to provide full wave rectification for the signals applied both to the silicon controlled rectifier 20 and to the feedback signal filter 60. The bridge rectifier applying a D.C. voltage across the silicon controlled rectifier 20 from the winding 16 of the transformer 14 is shown comprising the diodes 70, 71, 72 and 73. The triggering signals applied to the gating electrode 21 of the silicon controlled rectifier 20 from the unijunction transistor 30 are shown transmitted via a pulse transformer 77. A diode 75 is included to bypass the inverse peak voltages from the secondary of the transformer 77. Operating potentials for the unijunction transistor 30 and the servo amplifier 36 are shown provided by a D.C. source. This, however, may if desired be derived from a network such as the filter capacitor 28 and the zener diode 34 connected as shown in FIGURES 1 and 2. Feedback control signals from the output terminals 12 are directed via transformer 78 and a bridge rectifier 66 to the filter circuit 60 and thence to the potentiometer 57 of the servo amplifier 36. The operation of the circuit of FIGURE 3 is similar to that described in connection with the circuits of FIGURES 1 and 2.

It will be appreciated from an understanding of the above-described arrangements that the invention advantageously serves to provide an improved voltage regulator for a source of alternating voltage such as an A.C. line. By virtue of the simple circuit arrangements described hereinabove such voltage regulation is achieved with enhanced stability and reliability and a reduction in the cost and space required to provide the regulating equipment.

Although there have been described above specific arrangements of voltage regulators in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A voltage regulating circuit for providing a preselected magnitude of output voltage from an A.C. input voltage comprising corresponding sets of input and output terminals, a transformer having a winding connected in series between the input and output terminals, means connected in shunt with the output terminals for developing a voltage across the winding of the transformer to compensate for variable deviations of the output voltage from the preselected value including a silicon controlled rectifier serially connected to a second winding of the transformer, a free-running oscillator for triggering the silicon controlled rectifier in synchronism therewith, and means for controlling the repetition rate of the free-running oscillator in response to fluctuations of the output voltage.

2. A voltage regulating circuit for developing an output voltage of a preselected value from an applied A.C. voltage comprising input and output terminals, a voltage compensating transformer having first and second windings, the first of said windings being connected to conduct load current between the input and output terminals, repetitively cycling current conducting means connected in series with the second winding of the transformer across the input terminals, and means for controlling the repetition rate of the repetitively cycling means in accordance with variations in voltage at the output terminals in order to maintain the output voltage at a preselected value.

3. A voltage regulating circuit for an A.C. line comprising a pair of input terminals, a pair of output terminals, a voltage compensating transformer having a first winding connected in series between input and output terminals, a semiconductor switching device connected in series with a second winding of the transformer across the input terminals, frequency controlled pulse generating means coupled to the switching device, a self-quenching circuit connected across the switching device for terminating conduction therein, means for deriving a unidirectional signal in accordance with the magnitude of the voltage at the output terminals, and means for applying the unidirectional signal with appropriate phase and magnitude so as to control the repetition rate of the pulse generating means, thus causing the first winding of the transformer to compensate for variations in the voltage applied at the input terminals.

4. A voltage regulating circuit for an A.C. line comprising a pair of input terminals to which an A.C. voltage to be regulated may be applied, a pair of output terminals across which an alternating voltage of a preselected magnitude is to be maintained, voltage compensating means comprising a transformer having a first winding connected between corresponding input and output terminals and a second winding, a silicon controlled rectifier connected in series with the second winding across the input terminals, means for maintaining a unidirectional voltage across the silicon controlled rectifier, means for repetitively triggering the silicon controlled rectifier into conduction, means for terminating conduction in the silicon controlled rectifier at a predetermined time interval after the initiation of conduction therein, and means for causing the rate at which the silicon control rectifier is triggered into conduction to vary in accordance with fluctuations of voltage at the output terminals.

5. A voltage regulating circuit for an A.C. signal comprising a pair of input terminals, a pair of output terminals, a first transformer connected to the input terminals for reducing the magnitude of the voltage applied to the input terminals, a second transformer connected to the output terminals for increasing the voltage from the first transformer by an amount which is dependent upon the voltage at the output terminals, electronic switching means including a silicon controlled rectifier connected to a winding of the second transformer for controlling the current therethrough, repetitive cycling means connected to the silicon controlled rectifier for repetitively initiating current conduction therein at a variable rate, means for terminating conduction in the silicon controlled rectifier a predetermined interval after initiation of conduction therein, means connected to the output terminals for deriving a D.C. signal having a magnitude corresponding to the amplitude of the A.C. output voltage, and means for controlling the repetition rate of the repetitive cycling means in accordance with the D.C. signal derived from the output terminals.

6. An A.C. voltage regulating circuit having input and output terminals and comprising inductive coupling means connected in a load current series path between the input and output terminals, means for controlling current in the inductive coupling means comprising a silicon controlled rectifier connected in a shunt path for conducting current at successive time intervals, pulse generating means connected to the silicon controlled rectifier for initiating current conduction therein, and means for controlling the repetition rate of the pulse generating means in response to the A.C. voltage at the output terminals.

7. An A.C. voltage regulating circuit having input and output terminals and comprising inductive coupling means connected in a load current series path between the input and output terminals, means for controlling current in the inductive coupling means comprising a silicon controlled rectifier connected in a shunt path for conducting current at successive time intervals and filtering means including an inductance in series with the silicon controlled rectifier and a capacitor connected in parallel therewith, pulse generating means connected to the silicon controlled rectifier for initiating current conduction therein, and means for controlling the repetition rate of the pulse generating means in response to the A.C. voltage at the output terminals.

8. An A.C. voltage regulating circuit having input and output terminals and comprising inductive coupling means connected in a load current series path between the input and output terminals, means for controlling current in the inductive coupling means comprising a silicon controlled rectifier connected in a shunt path for conducting current at successive time intervals, pulse generating means including a unijunction transistor and a resistance-capacitance network arranged as a relaxation oscillator, the unijunction transistor being connected to the silicon controlled rectifier for periodically initiating current conduction therein, and means for controlling the repetition rate of the pulse generating means in response to the A.C. voltage at the output terminals.

9. An A.C. regulating circuit in accordance with claim 8 further comprising a self-quenching circuit including an inductive choke and a capacitor in series, the self-quenching circuit being connected across the silicon controlled rectifier for extinguishing conduction therein at a predetermined time interval after conduction is initiated.

10. An A.C. voltage regulating circuit having input and output terminals and comprising inductive coupling means connected in a load current series path between the input and output terminals, means for controlling the current in the inductive coupling means comprising a silicon controlled rectifier connected in a shunt path for conducting current at successive time intervals, controllable pulse generating means connected to the silicon controlled rectifier for periodically initiating current conduction therein, and means for controlling the repetition rate of the pulse generating means in response to the A.C. voltage at the output terminals comprising means for deriving a unidirectional voltage signal from the A.C. voltage at the output terminals and means for applying the unidirectional signal to the pulse generating means.

11. An A.C. voltage generating circuit in accordance with claim 10 wherein the unidirectional signal deriving means comprises a transformer connected across the output terminals and a rectifier connected to the transformer.

12. An A.C. voltage generating circuit in accordance with claim 10 wherein the unidirectional signal deriving means comprises a rectifier and filter connected across the output terminals.

13. An A.C. voltage regulating circuit in accordance with claim 11 further comprising a bridge rectifier connected between the inductive coupling means and the silicon controlled rectifier, the silicon controlled rectifier being connected between one pair of opposing terminals of the bridge and the remaining pair of opposing terminals of the bridge being connected in series with the inductive coupling means across the input terminals.

14. An A.C. voltage regulating circuit in accordance with claim 13 further including a rectifier connected between the cathode and gating electrodes of the silicon controlled rectifier and poled in a direction to bypass pulses of a reverse polarity received from the pulse generating means.

References Cited in the file of this patent

UNITED STATES PATENTS 3,018,431     Goldstein _____ Jan. 23, 1962

OTHER REFERENCES

General Electric Controlled Rectifier Manual (copyright March 21, 1960), pp. 51, 52; pp. 71, 72; pp. 122, 26.